US012777412B2

(12) United States Patent
Ji et al.

(10) Patent No.: US 12,777,412 B2
(45) Date of Patent: Oct. 27, 2026

(54) RADIO LINK MONITORING

(71) Applicant: NOKIA TECHNOLOGIES OY, Espoo (FI)

(72) Inventors: Lianghai Ji, Aalborg (DK); Ling Yu, Kauniainen (FI); Vinh Van Phan, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 355 days.

(21) Appl. No.: 18/552,225

(22) PCT Filed: Feb. 25, 2022

(86) PCT No.: PCT/EP2022/054751

§ 371 (c)(1),
(2) Date: Sep. 25, 2023

(87) PCT Pub. No.: WO2022/199980

PCT Pub. Date: Sep. 29, 2022

(65) Prior Publication Data

US 2024/0172107 A1 May 23, 2024

(30) Foreign Application Priority Data

Mar. 24, 2021 (FI) ...................................... 20215333

(51) Int. Cl.
*H04W 48/18* (2009.01)
*H04L 1/1812* (2023.01)
(Continued)

(52) U.S. Cl.
CPC ........... *H04W 48/18* (2013.01); *H04L 1/1812* (2013.01); *H04W 24/08* (2013.01); *H04W 88/04* (2013.01)

(58) Field of Classification Search
CPC .... H04L 1/1812; H04W 24/10; H04W 24/08; H04W 88/04; H04W 48/18
See application file for complete search history.

(56) References Cited

U.S. PATENT DOCUMENTS 8,554,232 B2 10/2013 Wang
11,765,616 B2 * 9/2023 Zhang ..................... H04L 45/24 370/229

(Continued)

FOREIGN PATENT DOCUMENTS

EP 3790351 A2 3/2021
KR 102849337 B1 * 8/2025 .......... H04W 36/033

(Continued)

OTHER PUBLICATIONS

"3rd Generation Partnership Project; Technical Specification Group Radio Access Network; NR; Medium Access Control (MAC) protocol specification (Release 16)", 3GPP TS 38.321 v16.7.0, (Dec. 2021), 158 pages.

(Continued)

*Primary Examiner* — Mong-Thuy T Tran
(74) *Attorney, Agent, or Firm* — ALSTON & BIRD LLP

(57) ABSTRACT

Example embodiments relate to an apparatus, method and computer program for radio link monitoring, for example performed in relation to a user equipment to user equipment (UE to UE) sidelink relay arrangement. The method may comprise, for example, generating a data block comprising data for transmission over an egress link to a destination device, the data being received from one or more of a plurality of input devices over respective ingress links or being provided by the apparatus. The method may also comprise transmitting the data block to the destination device and selecting one or more end-to-end links between a said input device and the destination device, or the apparatus and the destination device, based on one or more (Continued)

properties of the generated data block. Radio link monitoring may be performed for the transmitted data block in relation to the selected one or more end-to-end links and radio link control performed in relation to at least one of the selected one or more end-to-end links based on the radio link monitoring.

18 Claims, 8 Drawing Sheets

(51) Int. Cl.
*H04W 24/08* (2009.01)
*H04W 88/04* (2009.01)

(56) References Cited

U.S. PATENT DOCUMENTS

| | | | | |
|---|---|---|---|---|
| 2004/0022223 | A1 | 2/2004 | Billhartz | |
| 2017/0127251 | A1 | 5/2017 | Yi et al. | |
| 2017/0149666 | A1* | 5/2017 | Kiykioglu | H04L 47/27 |
| 2018/0069618 | A1 | 3/2018 | Loehr et al. | |
| 2019/0260484 | A1 | 8/2019 | Nam et al. | |
| 2020/0259896 | A1* | 8/2020 | Sachs | H04L 63/0428 |
| 2020/0351707 | A1 | 11/2020 | Cheng | |
| 2021/0051512 | A1 | 2/2021 | Hampel et al. | |
| 2022/0159753 | A1* | 5/2022 | Kuo | H04W 76/14 |
| 2022/0295375 | A1* | 9/2022 | Wang | H04W 76/12 |
| 2022/0338092 | A1* | 10/2022 | Wang | H04W 40/22 |
| 2022/0361267 | A1* | 11/2022 | Wang | H04W 76/14 |
| 2023/0136875 | A1* | 5/2023 | Tenny | H04W 76/14<br>370/329 |
| 2023/0164665 | A1* | 5/2023 | Zhao | H04W 40/22<br>370/315 |
| 2023/0345462 | A1* | 10/2023 | Liu | H04W 76/14 |
| 2024/0373486 | A1* | 11/2024 | Freda | H04W 76/14 |

FOREIGN PATENT DOCUMENTS

| | | | | |
|---|---|---|---|---|
| TW | 202131670 | A * | 8/2021 | H04W 72/21 |
| WO | WO 2020/198586 | A1 | 10/2020 | |
| WO | WO-2020253511 | A1 * | 12/2020 | H04L 47/34 |

OTHER PUBLICATIONS

"3rd Generation Partnership Project; Technical Specification Group Radio Access Network; NR; Radio Link Control (RLC) protocol specification (Release 16)", 3GPP TS 38.322 v16.2.0, (Dec. 2020), 33 pages.

"3rd Generation Partnership Project; Technical Specification Group Radio Access Network; NR; Radio Resource Control (RRC) protocol specification (Release 16)", 3GPP TS 38.331 v16.7.0, (Dec. 2021), 963 pages.

"3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746 v15.1.1, (Apr. 2018), 55 pages.

"3rd Generation Partnership Project; Technical Specification Group Radio Access Network; Study on NR sidelink relay; (Release 17)", 3GPP TR 38.836 v17.0.0, (Mar. 2021), 26 pages.

Canon Research Centre France, "Discussion on RLF indication enhancement and local routing for R17-IAB", 3GPP TSG-RAN WG2 Meeting #113-e, R2-2101208, (Jan. 25-Feb. 5, 2021), 6 pages.

Huawei et al., "Summary of [AT112-e][611][Relay] Open issues on L2 relay", 3GPP TSG-RAN WG2 Meeting #112 electronic, R2-2010870, (Nov. 2-13, 2020), 20 pages.

International Search Report and Written Opinion for Patent Cooperation Treaty Application No. PCT/EP2022/054751 dated Jun. 10, 2022, 18 pages.

Jung et al., "A new way of extending network coverage: Relay-assisted D2D communications in 3GPP", ICT Express 2 (2016), pp. 117-121.

Office Action for Finland U.S. Appl. No. 20/215,333 dated Sep. 2, 2021, 8 pages.

Oppo, "New SID: Study on NR sidelink relay", 3GPP TSG RAN Meeting #86, RP-193253, (Dec. 9-12, 2019), 5 pages.

ZTE Corporation et al., "Discussion on relay discovery and link management", 3GPP TSG-RAN WG2 Meeting #111 electronic, R2-2006738, (Aug. 17-28, 2020), 4 pages.

* cited by examiner

300

| Ingress Link Sidelink Radio Bearer / Logical Channel IDs | Egress Link Sidelink Radio Bearer / Logical Channel IDs |
|---|---|
| LCID #1 in Ingress Link #1<br>LCID #2 in Ingress Link #1 | LCID #1 in Egress Link |
| LCID #3 in Ingress Link #1 | LCID #2 in Egress Link |
| LCID #4 in Ingress Link #1,<br>LCID #1 in Ingress Link #2 | LCID #3 in Egress Link |
| LCID #2 in Ingress Link #2 | LCID #4 in Egress Link |
| LCID #3 in Ingress Link #2 | LCID #5 in Egress Link |

*FIG. 3A*

301

| End-to-End (E2E) Link Sidelink Radio Bearer / Logical Channel IDs | Egress Link Sidelink Radio Bearer / Logical Channel IDs |
|---|---|
| LCID #1 in E2E Link #1<br>LCID #2 in E2E Link #1 | LCID #1 in Egress Link |
| LCID #3 in E2E Link #1 | LCID #2 in Egress Link |
| LCID #4 in E2E Link #1,<br>LCID #1 in E2E Link #2 | LCID #3 in Egress Link |
| LCID #2 in E2E Link #2 | LCID #4 in Egress Link |
| LCID #3 in E2E Link #2 | LCID #5 in Egress Link |

*FIG. 3B*

RADIO LINK MONITORING

CROSS-REFERENCE TO RELATED APPLICATIONS

This application is a national phase entry of International Application No. PCT/EP2022/054751, filed Feb. 25, 2022, which claims priority to Finnish Application No. 20215333, filed Mar. 24, 2021, the contents of which are hereby incorporated by reference in their entirety.

FIELD

Example embodiments relate to an apparatus, method and computer program for radio link monitoring, for example performed in relation to a user equipment to user equipment (UE to UE) sidelink relay arrangement.

BACKGROUND

One way of extending network coverage in radio systems, such as in cellular radio systems, is to provide one or more relays for receiving data from one or more terminals, e.g. a user equipment (UE) and forwarding the received data onto another node.

Direct communications between two user equipment, as examples of Long Term Evolution (LTE) or New Radio (NR) devices, may be achieved using so-called LTE/NR sidelinks (hereafter “sidelinks”). Adaption of the core LTE/NR standard permits this direct communication between nearby LTE/NR devices via sidelinks without the need of going through a base station.

It has been proposed to use sidelinks to provide relaying functionality from, for example, a first user equipment to a second (relaying) user equipment for onwards re-transmission of data by the second user equipment to a destination user equipment. Where multiple user equipment transmit data to the second (relaying) user equipment over respective ingress links (channels) for onwards transmission via a consolidated egress link (channel) this may be termed an N:1 relaying configuration.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: generating a data block comprising data for transmission over an egress link to a destination device, the data being received from one or more of a plurality of input devices over respective ingress links or being provided by the apparatus; transmitting the data block to the destination device; selecting one or more end-to-end links between a said input device and the destination device, or the apparatus and the destination device, based on one or more properties of the generated data block; performing radio link monitoring for the transmitted data block in relation to the selected one or more end-to-end links; and performing radio link control in relation to at least one of the selected one or more end-to-end links based on the radio link monitoring.

The generated data block may comprise data from at least one of the one or more input devices and/or data provided by the apparatus.

The means for generating the data block may be configured to populate the data block with one or more sub-blocks, the or each sub-block corresponding to data received from an input device, or data provided by the apparatus, and associated at least with an identifier indicative of one or more of (i) the input device or (ii) the apparatus, (iii) the ingress link and (iv) the end-to-end link.

The one or more selected end-to-end links may be selected based on the one or more identifiers in the generated data block.

The means for generating the data block may be further configured to indicate, in the data block, the identity of one or more radio bearers or logical channels of the egress link over which the data block will be transmitted, wherein the one or more selected end-to-end links are selected based on the one or more egress link radio bearers or logical channels identified in the generated data block.

The apparatus may further comprise means for accessing reference data which maps ingress and/or end-to-end link radio bearer or logical channel identities to egress link radio bearer or logical channel identities, the one or more selected end-to-end links comprising the one or more end-to-end, or associated ingress links, whose radio bearer or logical channel identities are mapped to the one or more egress link radio bearer or logical channel identities identified in the generated data block.

The one or more selected end-to-end links may be selected based on determining that the generated data block is set to operate in a radio link control (RLC) acknowledged mode (AM).

The one or more selected end-to-end links may be selected based on determining that data sent directly between one or more of the input devices and the destination device would operate in an RLC unacknowledged mode and/or HARQ disabled mode, and responsive to said determination, determining not to select the end-to-end links associated with said one or more input devices.

The one or more selected end-to-end links may be selected based on determining that the generated data block comprises a first sub-block associated with high priority data of a first end-to-end link and a second sub-block associated with low priority data of a second end-to-end link, and responsive to said determination, determining to select the first end-to-end link and not the second end-to-end link.

The generated data block may be a Media Access Control (MAC) Protocol Data Unit (PDU) or a Radio Link Control (RLC) Protocol Data Unit (PDU).

The radio link control means may be configured to terminate, or cause termination of, one or more of the end-to-end links based on determination by the radio link monitoring means of a radio link failure (RLF) condition.

The radio link monitoring means may be configured to determine a radio link failure (RLF) condition based on one or more of:

(i) a predetermined threshold number of retransmissions of the data block to the destination device having been reached; and (ii) a predetermined threshold number of consecutive HARQ feedback discontinuous transmissions from the destination device.

The apparatus and the respective input devices may be user equipment (UE) devices.

The destination device may be a user equipment (UE) device or a network node, e.g. a base station.

According to a second aspect, there is described a method comprising: generating, by an apparatus, a data block comprising data for transmission over an egress link to a destination device, the data being received from one or more of a plurality of input devices over respective ingress links or being provided by the apparatus; transmitting the data block to the destination device; selecting one or more end-to-end links between a said input device and the destination device, or the apparatus and the destination device, based on one or more properties of the generated data block; performing radio link monitoring for the transmitted data block in relation to at least one of the selected one or more end-to-end links; and performing radio link control in relation to the selected one or more end-to-end links based on the radio link monitoring.

The generated data block may comprise data from at least one of the one or more input devices and/or data provided by the apparatus.

Generating the data block may comprise populating the data block with one or more sub-blocks, the or each sub-block corresponding to data received from an input device, or data provided by the apparatus, and associated at least with an identifier indicative of one or more of (i) the input device or (ii) the apparatus, (iii) the ingress link and (iv) the end-to-end link.

The one or more selected end-to-end links may be selected based on the one or more identifiers in the generated data block.

Generating the data block may further comprise indicating, in the data block, the identity of one or more radio bearers or logical channels of the egress link over which the data block will be transmitted, wherein the one or more selected end-to-end links are selected based on the one or more egress link radio bearers or logical channels identified in the generated data block.

The method may further comprise accessing reference data which maps ingress and/or end-to-end link radio bearer or logical channel identities to egress link radio bearer or logical channel identities, the one or more selected end-to-end links comprising the one or more end-to-end, or associated ingress links, whose radio bearer or logical channel identities are mapped to the one or more egress link radio bearer or logical channel identities identified in the generated data block.

The one or more selected end-to-end links may be selected based on determining that the generated data block is set to operate in a radio link control (RLC) acknowledged mode (AM).

The one or more selected end-to-end links may be selected based on determining that data sent directly between one or more of the input devices and the destination device would operate in an RLC unacknowledged mode and/or HARQ disabled mode, and responsive to said determination, determining not to select the end-to-end links associated with said one or more input devices.

The one or more selected end-to-end links may be selected based on determining that the generated data block comprises a first sub-block associated with high priority data of a first end-to-end link and a second sub-block associated with low priority data of a second end-to-end link, and responsive to said determination, determining to select the first end-to-end link and not the second end-to-end link.

The generated data block may be a Media Access Control (MAC) Protocol Data Unit (PDU) or a Radio Link Control (RLC) Protocol Data Unit (PDU).

Performing radio link control (LC) may comprise terminating, or causing termination of, one or more of the end-to-end links based on determination by the radio link monitoring of a radio link failure (RLF) condition.

Radio link monitoring may comprise determining a radio link failure (RLF) condition based on one or more of:

(i) a predetermined threshold number of retransmissions of the data block to the destination device having been reached; and (ii) a predetermined threshold number of consecutive HARQ feedback discontinuous transmissions from the destination device.

According to a third aspect, there is provided a computer program product comprising a set of instructions which, when executed on an apparatus, is configured to cause the apparatus to carry out the method of: generating, by an apparatus, a data block comprising data for transmission over an egress link to a destination device, the data being received from one or more of a plurality of input devices over respective ingress links or being provided by the apparatus; transmitting the data block to the destination device; selecting one or more end-to-end links between a said input device and the destination device, or the apparatus and the destination device, based on one or more properties of the generated data block; performing radio link monitoring for the transmitted data block in relation to at least one of the selected one or more end-to-end links; and performing radio link control in relation to the selected one or more end-to-end links based on the radio link monitoring.

According to a fourth aspect, there is provided a non-transitory computer readable medium comprising program instructions stored thereon for performing a method, comprising: generating, by an apparatus, a data block comprising data for transmission over an egress link to a destination device, the data being received from one or more of a plurality of input devices over respective ingress links or being provided by the apparatus; transmitting the data block to the destination device; selecting one or more end-to-end links between a said input device and the destination device, or the apparatus and the destination device, based on one or more properties of the generated data block; performing radio link monitoring for the transmitted data block in relation to at least one of the selected one or more end-to-end links; and performing radio link control in relation to the selected one or more end-to-end links based on the radio link monitoring.

According to a fifth aspect, there is provided an apparatus comprising: at least one processor; and at least one memory including computer program code which, when executed by the at least one processor, causes the apparatus: to generate, by an apparatus, a data block comprising data for transmission over an egress link to a destination device, the data being received from one or more of a plurality of input devices over respective ingress links or being provided by the apparatus; to transmit the data block to the destination device; to select one or more end-to-end links between a said input device and the destination device, or the apparatus and the destination device, based on one or more properties of the generated data block; to perform radio link monitoring for the transmitted data block in relation to at least one of the selected one or more end-to-end links; and performing radio link control in relation to the selected one or more end-to-end links based on the radio link monitoring.

BRIEF DESCRIPTION OF DRAWINGS

Example embodiments will now be described by way of non-limiting example, with reference to the accompanying drawings, in which:

FIGS. 3A and 3B show respective tabular representations of example reference data that may be used according to some example embodiments;

DETAILED DESCRIPTION

Example embodiments relate to an apparatus, method and computer program for radio link monitoring (RLM), for example performed in relation to a user equipment to user equipment (UE to UE, or U2U) sidelink relay arrangement or similar.

Direct communications between two user equipment, as examples of Long Term Evolution (LTE)/New Radio (NR) devices, may be achieved using so-called LTE/NR sidelinks (hereafter "sidelinks") based on the so-called PC5 interface. Adaption of the core LTE/NR standard permits this direct communication between nearby LTE/NR devices via sidelinks without the need of going through a base station. It has been proposed in 3GPP Release-17 to use sidelinks for provide relaying functionality from, for example, a first user equipment to a second (relaying) user equipment for onwards re-transmission of data by the second user equipment to a third user equipment.

Where multiple user equipment transmit data to the second (relaying) user equipment over respective ingress links (logical channels) for onwards transmission via a consolidated egress link (logical channel) this may be termed an N:1 relaying configuration. The ingress and egress links may be PC5 links, i.e. sidelinks. Each sidelink may comprise one or more radio bearers/logical channels having respective logical channel identifiers (LCIDs). One or more ingress link radio bearers/logical channels may be mapped to one or more egress link radio bearers/logical channels for this purpose.

Figure 1:
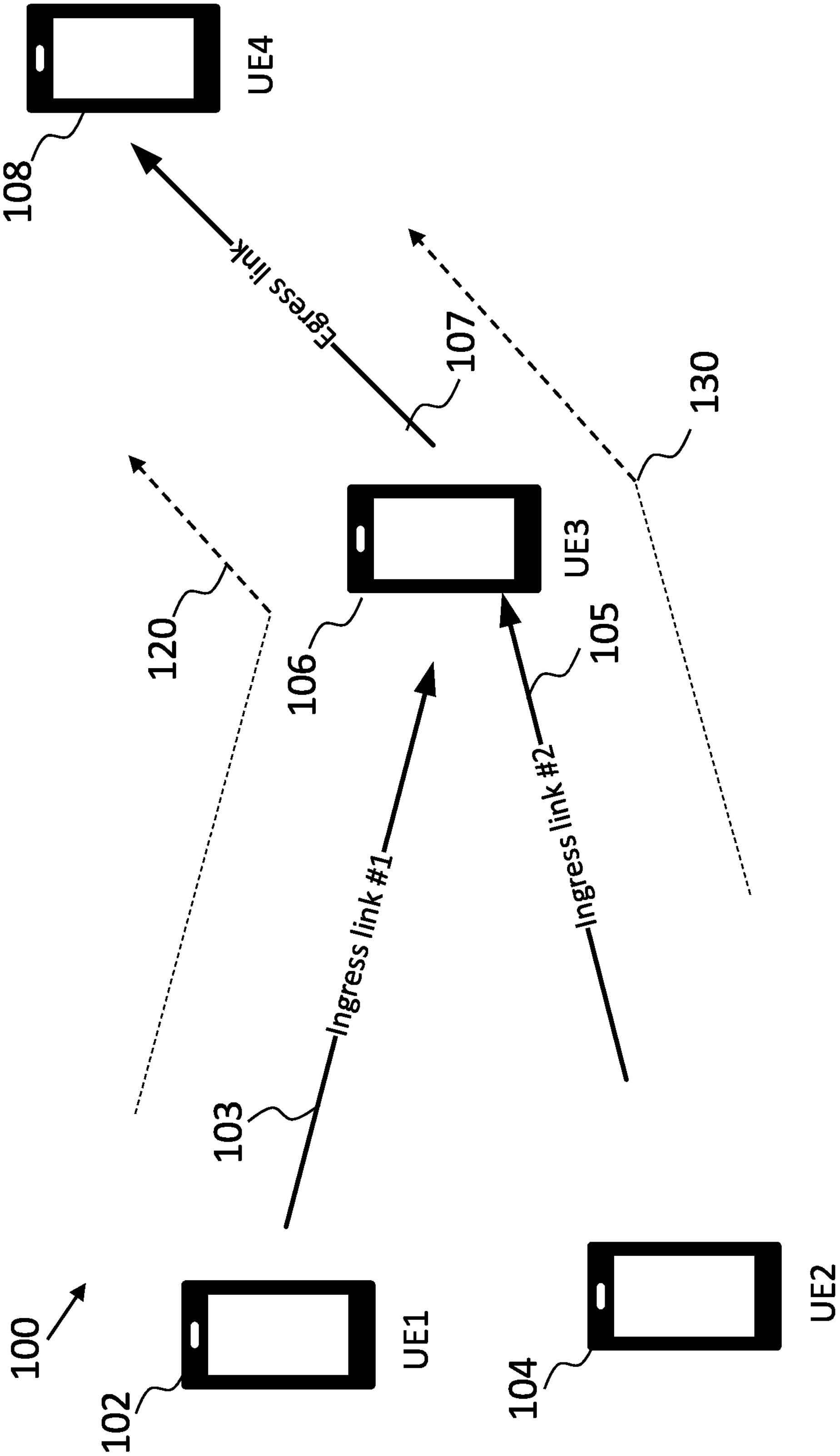
FIG. 1 is a schematic diagram of a first network scenario according to some example embodiments.
Figure 6:
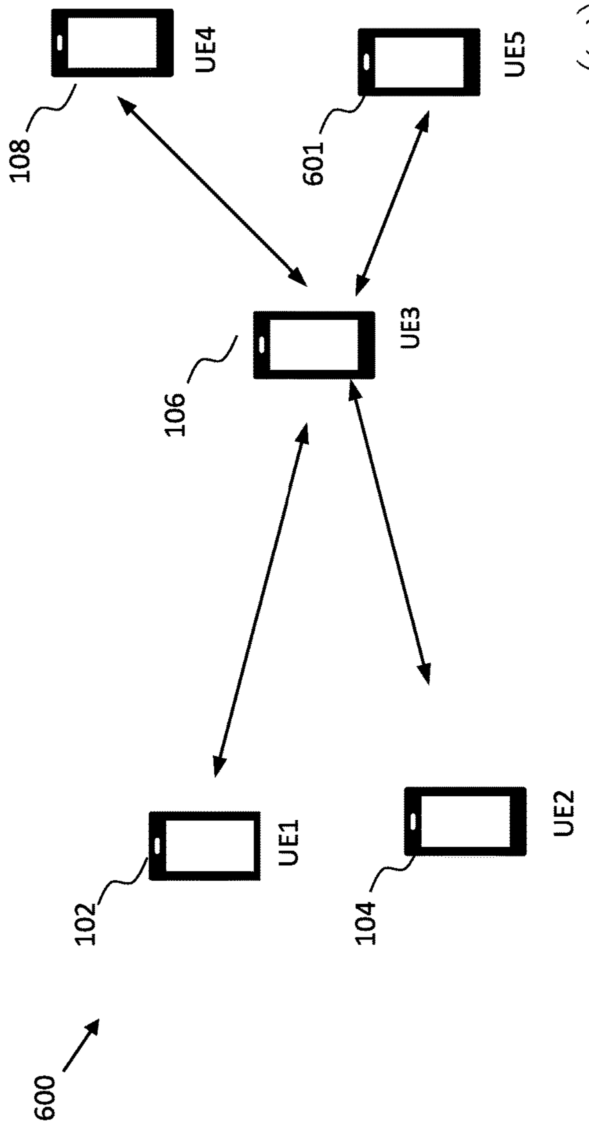
FIG. 6 is a schematic diagram of a second network scenario according to some example embodiments.
Figure 7:
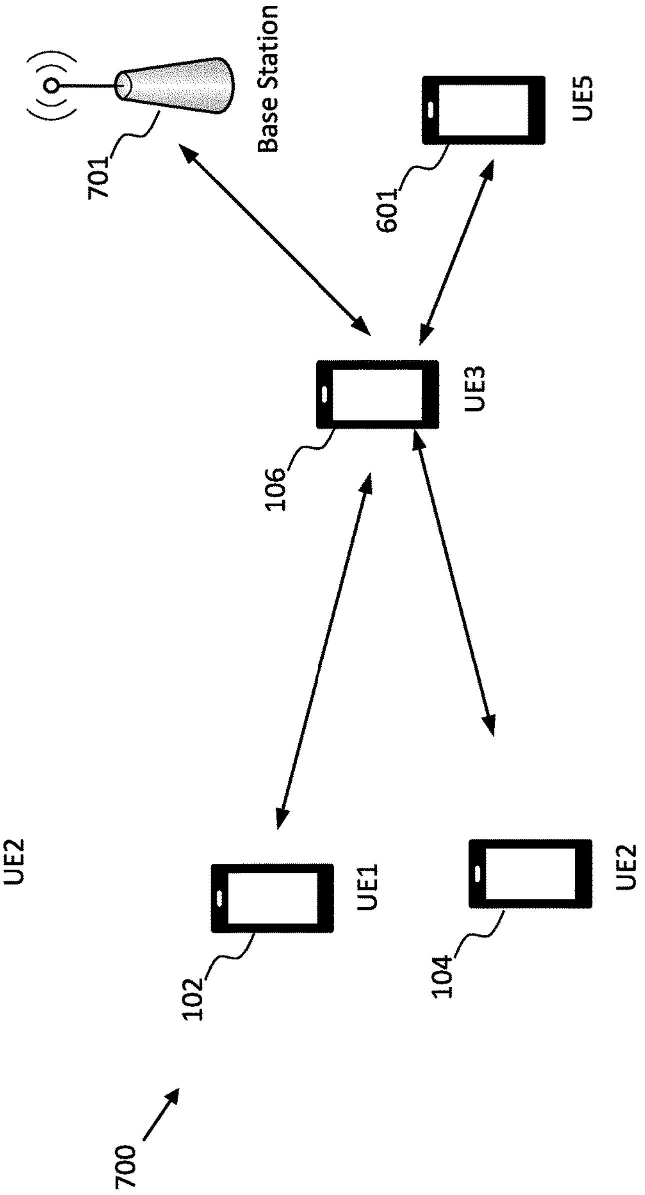
FIG. 7 is a schematic diagram of a third network scenario according to some example embodiments.

Referring to FIG. 1, there is shown an N:1 relaying configuration 100 which may be useful for understanding example embodiments. FIGS. 6 and 7, described later on, show other relaying configurations 600, 700.

The relaying configuration 100 is comprised of first and second (and potentially more) input user equipment 102, 104 (UE1, UE2) respectively connected to a third user equipment 106 (UE3) via first and second ingress links 103, 105. The first and second ingress links 103, 105 may be established as PC5 links according to the relevant standard and set-up procedure which is known in the field and not covered here. The third user equipment 106 may be connected to a fourth user equipment 108 (UE4) via an egress link 107. The egress link 107 may also be established as a PC5 link according to the relevant standard and set-up procedure referred to above. The fourth user equipment 108 may be termed a destination user equipment or similar.

The third user equipment 106 may therefore be termed a relay, or forwarding node, in the sense that it is capable of relaying or forwarding data received from one or both of the first and second input user equipment 102, 104 over the respective first and second ingress links 103, 105 by means of generating a data block which is then transmitted to the fourth user equipment 108 over the egress link 107. For the avoidance of doubt, however, the third user equipment 106 may generate or provide its own data which may be provided in a generated data block which is transmitted to the fourth user equipment 108 over the egress link 107.

It will be appreciated therefore that the shown relaying configuration 100 comprises first and second end-to-end links 120, 130. The first end-to-end link 120 comprises the first ingress link 103 and the egress link 107, i.e. first and second "hops" between the first user equipment 102 and the fourth user equipment 108. Similarly, the second end-to-end link 130 comprises the second ingress link 105 and the egress link 107, i.e. first and second hops between the second user equipment 104 and the fourth user equipment 108. It will be appreciated that there may be additional end-to-end links based on there being additional input user equipment and hence additional ingress links. In addition, it will be appreciated that there may be additional end-to-end link(s) based on, for example, a direct communication between the third user equipment 106 and the fourth user equipment 108 without using a relay.

Data received over the ingress links 103, 105 may be in any suitable form, such as Media Access Control (MAC) protocol data units (PDUs) comprising header and payload information. The payload information may represent at least some of the data that is to be forwarded to the fourth user equipment 108.

The PDU may comprise, for example at least partly in the header, a source identifier (Source_ID) which may indicate either the first or second user equipment 102, 104 from which the PDU originates.

The PDU may comprise, for example at least partly in the header, a destination identifier (Destination_ID) which may indicate where the payload information is to be transmitted, i.e. to the third/fourth user equipment 106/108 in this case.

In one option, the Source_IDs and the Destination_ID may be used by the third user equipment 106 to identify therefore the PC5 links between each of the first and second user equipment 102, 104 and the fourth user equipment 108, i.e. the first and second end-to-end links 120, 130 described above.

In another option, the Source_IDs and the Destination_ID may be used by the third user equipment 106 to identify the PC5 links between each of the first and second user equipment 102, 104 and the third user equipment 106. In addition, an adaptation layer, e.g. described in 3GPP TR 38.836, may be used on top of the RLC layer over the PC5 interface, where an adaptation layer header is added and used to further identify the first and second end-to-end links 120, 130 between each of the first and second user equipment 102, 104 and the fourth user equipment 108. Thus, after the third user equipment 106 receives the data from an ingress link, it knows the identifier of the destination user equipment of the end-to-end link for that data, and it can transmit the received data to the destination user equipment accordingly.

Figure 2:
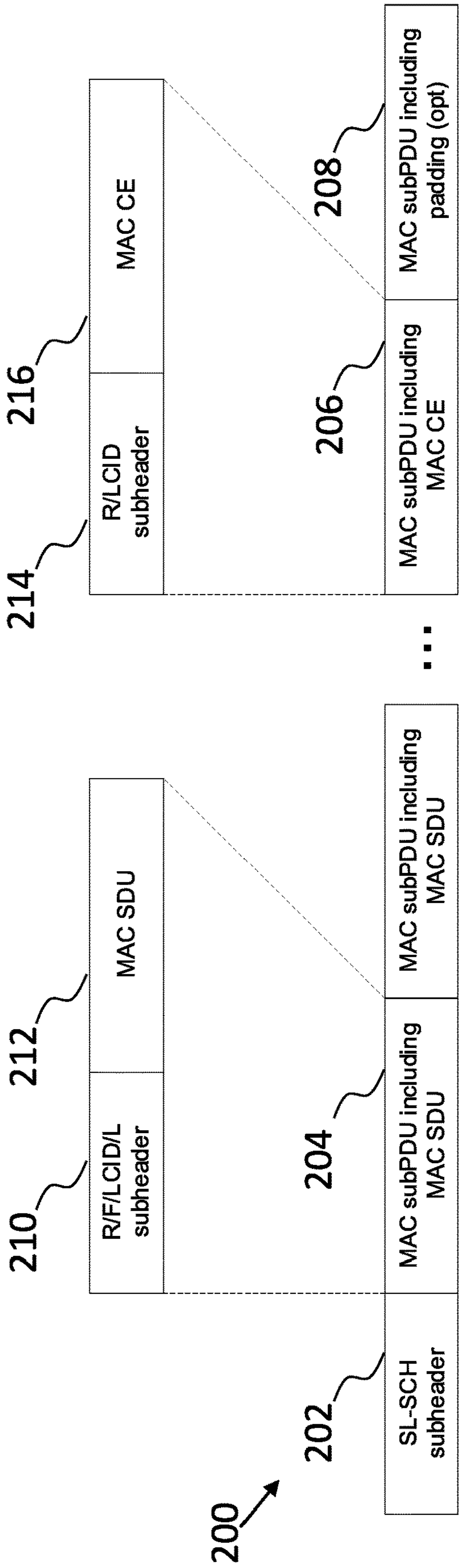
FIG. 2 is a schematic view of an example structure of a data block, which may be useful for understanding some example embodiments.

FIG. 2 is a schematic view of an example MAC layer sidelink PDU 200, which may be useful for understanding example embodiments.

The sidelink PDU 200 may comprise a sidelink shared channel (SL-SCH) subheader 202, one or more MAC subPDUs 204 including MAC service data units (SDUs), a MAC subPDU 206 including a MAC control element (MAC-CE) and a MAC subPDU 208 including optional padding.

Part of the Source_IDs and/or the Destination_ID may be carried in the SL-SCH 202 and another part may be carried in physical layer sidelink control information.

Other portions 210, 212, 214, 216 of the sidelink PDU 200 may be used, for example to identify a radio bearer or logical channel identifier (LCID) and associated payload information i.e. the data/control to be transmitted using that radio bearer/logical channel. The payload information may be comprised within a MAC Service Data Unit (SDU) 212. As can be seen in FIG. 2, each MAC subPDU 204/206 may indicate a radio bearer/LCID associated with an SDU 212 or MAC CE 216.

Therefore, upon the third user equipment 106 receiving the PDU 200, it can be determined by processing functionality of the third user equipment which of the first and second user equipment 102, 104 the payload information comes from, which logical channel it is received over of the respective first and second ingress links 103, 105, as well as the identity of the fourth user equipment 106, e.g. by reading the adaptation layer header carried in adaptation layer PDU, to which it is destined. In addition, the third user equipment 106 may also know a radio bearer or logical channel over which the payload data is to be transmitted over the egress link 107, e.g. by considering the configured radio bearer or logical channel mapping between the ingress link 103, 105 and the egress link. The processing functionality referred to may comprise hardware, software, firmware or a combination thereof which may be configured to operate in accordance with example embodiments to be described herein.

For avoidance of doubt, FIG. 2 is given merely as an example. The particular form of what is termed a PDU 200 may comprise any suitable format within the scope of example embodiments described herein.

The third user equipment 106 may be configured to generate a data block for transmission to the fourth user equipment 108.

This data block may, for example, comprise a transport block (TB) which may be the same or similar in format to the PDU 200 shown in FIG. 2 but which is not necessarily limited to that format. The particular format of what is termed a data block may comprise any suitable arrangement or structure within the scope of example embodiments described herein.

The data block may comprise at least some of the data received in a PDU 200 from one or both of the first and second user equipment 102, 104. For example, the third user equipment 106 may be configured to multiplex data received from the first and second user equipment 102, 104 based on some generating algorithm or standard, such as by using MAC layer logical channel prioritization (LCP) or similar. In LCP, as will be understood, the third user equipment 106 may generate the data block in such a way that the data block may meet quality of service (QOS) or other optimal or consistency requirements. For example, using LCP, the third user equipment may multiplex received data from the first and second user equipment 102, 104 according to respective priorities and configurations assigned to logical channels indicated by respective LCIDs in the relevant PDUs. LCP is known in the field and so further explanation is not considered necessary at this stage.

In one case, a data block may comprise an RLC PDU, e.g. which contains the data from one or multiple end-to-end links. In one example, when the RLC entity performs the RLM/RLF, it may consider the (re)transmission of an RLC PDU.

In some cases, the generated data block may comprise data only from one of the first and second user equipment 102, 104. In some cases, the generated data block may comprise data from none of the first and second user equipment 102, 104 and may comprise data generated by the third user equipment 106 only, at a given point in time.

The third user equipment 106 may also be configured to access a set of reference data which may map (or correspond) ingress link radio bearers or logical channels (using respective identifiers) to egress link radio bearers or logical channels (using respective identifiers). The reference data may be stored locally by the third user equipment 106 or may be stored at a remote source, e.g. on a cloud network, and accessed by the third user equipment 106. The reference data mappings may be pre-configured or configured by network and/or by another user equipment.

FIG. 3A is a tabular representation of a set of example reference data 300 which may be accessed by the third user equipment 106 according to some example embodiments.

As indicated in FIG. 3A, the reference data 300 shows that data received over the first ingress link 103 using a first logical channel having LCID #1 is mapped to a first logical channel having LCID #1 for the egress link 107.

Thus, the third user equipment 106, may, when generating the data block for transmission to the fourth user equipment 108, know which logical channel of the egress link 107 to send the relevant data over, based on the mapping. The LCID used for the egress link 107 may be inserted in the generated data block in association with the relevant data.

Also, in this example:

- data received over the first ingress link 103 using a second logical channel having LCID #2 is mapped also to the first logical channel having LCID #1 for the egress link 107;
- data received over the first ingress link 103 using a third logical channel having LCID #3 is mapped to a second logical channel having LCID #2 for the egress link 107;
- data received over the first ingress link 103 using a fourth logical channel having LCID #4 is mapped to a third logical channel having LCID #3 for the egress link 107;
- data received over the second ingress link 105 using a first logical channel having LCID #1 is also mapped to the third logical channel having LCID #3 for the egress link 107;
- data received over the second ingress link 105 using a second logical channel having LCID #2 is mapped to a fourth logical channel having LCID #4 for the egress link 107; and
- data received over the second egress link 105 using a third logical channel having LCID #3 is mapped to a fifth logical channel having LCID #5 for the egress link 107.

FIG. 3A indicates a first set of example reference data 300 which maps ingress link radio bearers or logical channels to egress link radio bearers or logical channels.

There may be other options for the third user equipment 106 to map data to egress link radio bearers or logical channels. For example, the third user equipment 106 may be configured to access a set of reference data which may map (or correspond) end-to-end link radio bearers or logical channels (using respective identifiers) to egress link radio bearers or logical channels (using respective identifiers). In this case, the third user equipment 106 may receive data from an ingress link, which indicates the identity information of source and/or destination remote user equipment of the end-to-end link and the associated end-to-end link radio bearer(s) or logical channel(s), e.g. in its adaptation layer header(s) as described in 3GPP TR 38.836. Then, the third user equipment 106 may use the set of reference data to determine the egress link radio bearer(s) or logical channel (s). In this case, as one example, the first column of the FIG. 3A reference data 300 can be replaced by End-to-End (E2E) Link Sidelink Radio Bearer/Logical Channel IDs, as shown in FIG. 3B as a second set of example reference data 301

Radio link monitoring, hereafter RLM, is a process by which a node may infer the radio link quality of a given radio link. According to the result of RLM, radio link control (RLC) may be performed. Please note, the to-be-performed RLC is a procedure/behaviour/action different from the RLC layer in protocol stacks for sidelink relays.

For example, RLM may detect a radio link failure (RLF) condition, e.g., if a predetermined number of PDU retransmissions in an RLC entity, or automatic repeat requests (ARQ or HARQ) in MAC has been reached.

According to 3GPP Specification 38.331, for example, a sidelink RLC entity, such as placed in the third user equipment 106 in the FIG. 1, for example, may trigger an RLF condition/declaration with, for example, the fourth user equipment 108:

- upon indication by the sidelink RLC entity (e.g. of the third user equipment 106) that a maximum (predetermined) number of retransmissions of an RLC PDU to the destination user equipment, i.e. the fourth user equipment 108, has been reached; or
- upon indication from the sidelink MAC entity (e.g. of the third user equipment 106) that a maximum (predetermined) number of consecutive hybrid HARQ discontinuous transmissions (DTXs) from the destination user equipment, i.e. the fourth user equipment, has been reached.

Other forms of RLM determinations may trigger an RLF condition/declaration, and the above two examples are for illustration.

According to 3GPP Release 16, a sidelink RLM procedure may be performed by taking account of each MAC/RLC PDU (re-)transmission.

However, this legacy procedure does not take into account the end-to-end links as mentioned previously which the third user equipment 106 serves. Thus, if the third user equipment 106 were to trigger a RLF condition with the fourth user equipment 108, the third user equipment may, in terms of RLC actions, release (disconnect) the sidelink (i.e. the egress link 107) to the fourth user equipment and notify the first and second user equipment 102, 104 with a sidelink release command which may trigger said first and second user equipment to release their respective sidelinks, i.e. the first and second ingress links 103, 105 with the third user equipment. This RLC behaviour therefore affects all ingress links 103, 105 which may be unnecessary. For example, it may not consider different/dynamic characteristics of each of the first and second (and potentially more) end-to-end links 120, 130 as mentioned above.

Accordingly, example embodiments relate to RLM methods which may take into account affected end-to-end links rather than, for example, performing RLC actions based on RLM method in relation to all links in the manner introduced above.

Figure 4A:
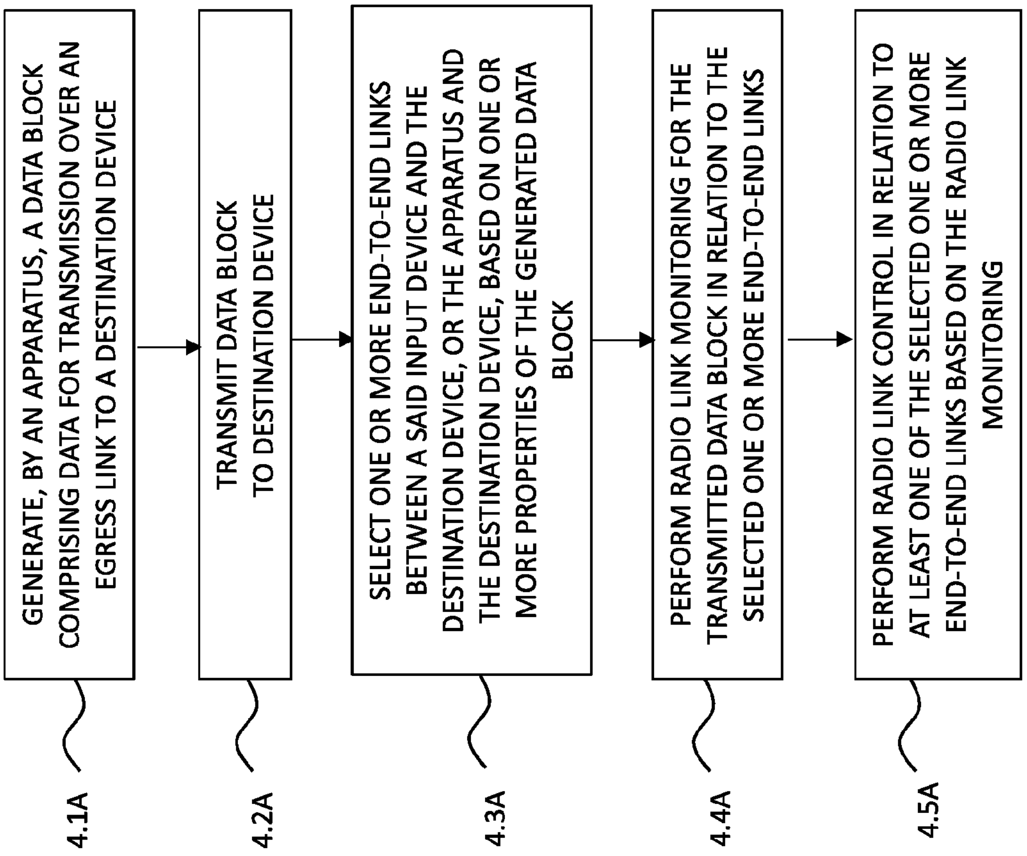
FIG. 4A is a flow diagram indicating processing operations that may be performed according to some example embodiments.

FIG. 4A is a flow diagram showing operations according to one or more example embodiments. The operations may be processing operations performed by hardware, software, firmware or a combination thereof. For example, the operations may, in the FIG. 1 configuration, be performed at or by the third user equipment 106. The numbering of operations is not necessarily indicative of the order of processing and, for example, some operations may be performed in a different order and/or in parallel.

A first operation 4.1A may comprise generating, by an apparatus, a data block comprising data for transmission over an egress link to a destination device. For example, the data may be received from one or more of a plurality of input devices over respective ingress links or provided by the apparatus.

A second operation 4.2A may comprise transmitting the data block to the destination device.

A third operation 4.3A may comprise selecting one or more end-to-end links between a said input device and the destination device, or the apparatus and the destination device, based on one or more properties of the generated data block.

A fourth operation 4.4A may comprise performing radio link monitoring for the transmitted data block in relation to the selected one or more end-to-end links.

A fifth operation 4.5A may comprise performing radio link control in relation to at least one of the selected one or more end-to-end links based on the radio link monitoring.

Figure 4B:
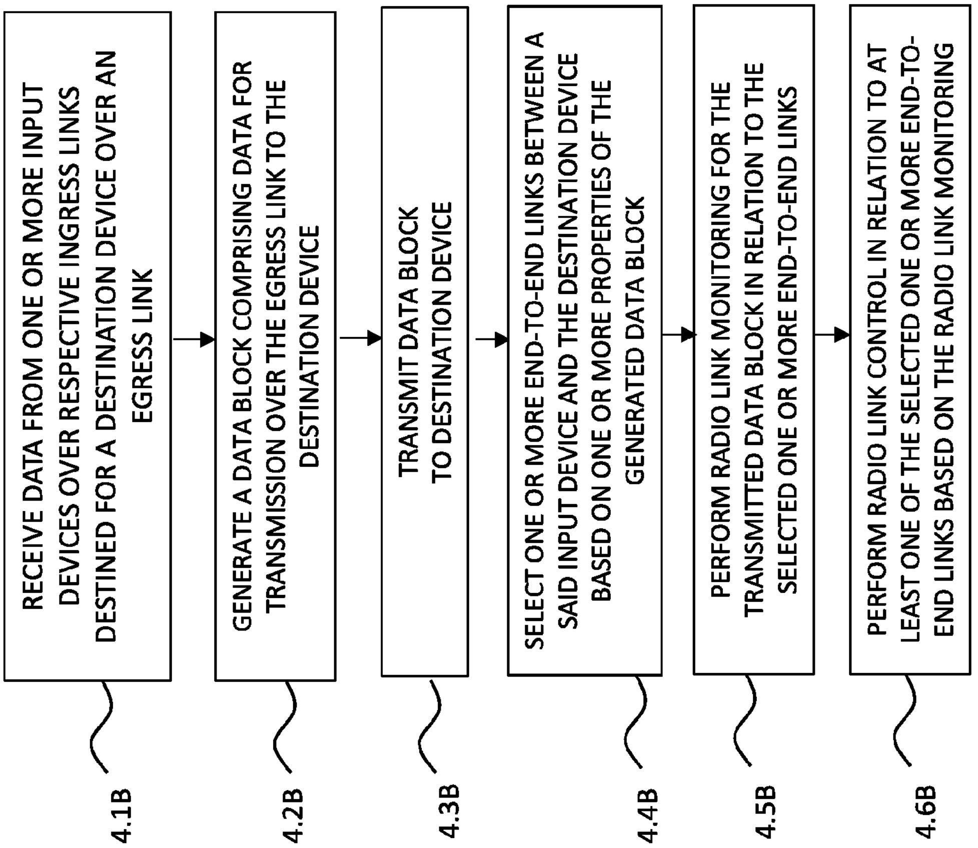
FIG. 4B is a further flow diagram indicating processing operations that may be performed according to some example embodiments.

FIG. 4B is another flow diagram showing operations according to one or more example embodiments. In this case, the data is received from one or more input devices over respective ingress links. The operations may be processing operations performed by hardware, software, firmware or a combination thereof. For example, the operations may, in the FIG. 1 configuration, be performed at or by the third user equipment 106. The numbering of operations is not necessarily indicative of the order of processing and, for example, some operations may be performed in a different order and/or in parallel.

A first operation 4.1B may comprise receiving data from one or more of a plurality of input devices over respective ingress links, the received data being destined for a destination device over an egress link.

A second operation 4.2B may comprise generating a data block comprising data for transmission over the egress link to the destination device.

A third operation 4.3B may comprise transmitting the data block to the destination device.

A fourth operation 4.4B may comprise selecting one or more end-to-end links between a said input device and the destination device based on one or more properties of the generated data block.

A fifth operation 4.5B may comprise performing radio link monitoring (RLM) for the transmitted data block in relation to the selected one or more end-to-end links.

A sixth operation 4.6B may comprise performing radio link control (RLC) in relation to at least one of the selected one or more end-to-end links based on the radio link monitoring.

As mentioned above, the ingress links may be pre-established sidelinks, such as the first and second ingress links 103, 105 and the egress link 107 described in relation to FIG. 1. The generated data block may be a transport block (TB) or a RLC PDU and may comprise data from at least one of the one or more input devices and/or data generated by the apparatus itself, at a given time. The data from the one or more input devices, e.g. the first and second user equipment 102, 104 described in relation to FIG. 1, may be received in any suitable data format In some example embodiments, generating the data block may comprise populating the data block with one or more sub-blocks, e.g. in a protocol layer, e.g. sub PDUs, each sub-block corresponding to data received from an input device or generated by the apparatus itself and associated at least with an identifier indicative of the input device or the apparatus and/or ingress link from which the data was received.

In some example embodiments, in terms of one or more properties of the generated data block, the one or more selected end-to-end links may be selected based on the one or more input device, the apparatus and/or ingress link identifiers, or user equipment identifiers, in the generated data block, to be explained below In some example embodiments, generating the data block may further comprise indicating, in the data block, the identity of one or more radio bearers or logical channels of the egress link over which the data block will be transmitted, wherein the one or more selected end-to-end links for radio link control are based on the one or more egress link radio bearers or logical channels identified in the data block, i.e. as properties of the generated data block. In some example embodiments, reference data may be accessed which maps ingress/end-to-end link radio bearer or logical channel identities to egress link radio bearer or logical channel identities, the one or more selected end-to-end links comprising the one or more ingress/end-to-end link identities which are mapped to the one or more egress link radio bearer or logical channel identities identified in the generated data block.

The following description expands on the above with reference to the N:1 configuration 100 described in relation to FIG. 1.

In one example embodiment, the third user equipment 106 may determine which of the first and second end-to-end links will be affected for RLM on a transmitted data block, based on which of the first and second ingress links 103, 105, or user equipment 102, 104 the generated data block contains data from. It is noted that the data block may be, e.g. a MAC PDU or an RLC PDU, depending on the entity performing the RLM, e.g. a MAC or RLC entity.

In the event of, for example, a RLF declared over the egress link 107 when performing RLM for the generated and transmitted data block, RLC may be performed for the affected (selected) end-to-end link(s), e.g. whether one or both of the first end-to-end link 120 and the second end-to-end link 130, and/or the direct link between the third user equipment 106 and the fourth user equipment 108.

An RLC action may comprise releasing one or more of the sidelinks but other forms of RLC action may be performed separately or in combination from sidelink release. The point is that the RLC action is performed only in relation to the affected (selected) end-to-end links 120, 130, and/or the direct link between the third user equipment 106 and the fourth user equipment 108 and not necessarily all ingress links 103, 105 which feed the consolidated egress link 107.

For example, if a data block generated by the third user equipment 106 is populated with data only from the first user equipment 102 and therefore associated with the first ingress link 103, only the first end-to-end link 120 may be affected/selected.

In the event of an RLF after transmitting this data block over the egress link, the appropriate RLC action may be performed for the first end-to-end link 120 only. For example, the RLC action may comprise releasing the first ingress link 103 but not the second ingress link 105 and nor the egress link 107. Thus, RLM in relation to this data block is effectively performed for the first end-to-end link and the RLC action allows the second end-to-end link 130 to remain operational.

Conversely, if a data block generated by the third user equipment 106 is populated with data from only the second user equipment 104 and therefore associated with the second ingress link 105, then only the second end-to-end link 130 may be affected/selected.

Similarly, in the event of an RLF declared over the egress link, the appropriate RLC action may comprise releasing the second ingress link 105 but not the first ingress link 103 and nor the egress link 107.

If a data block generated by the third user equipment 106 is populated with data from both the first and second user equipment 102, 104, and therefore both the first and second ingress links 103, 105, then both the first and second end-to-end links 120, 130 may be affected (selected) and hence an appropriate RLC action after an RLF is declared over the egress link may comprise releasing both the first and second ingress links and possibly the egress link 107.

In another example embodiment, the third user equipment 106 may determine which of the first and second end-to-end links 120, 130 are affected (selected) based on accessing reference data, such as the first example reference data 300 or the second example reference data 301 shown in the respective FIGS. 3A and 3B tables which maps ingress/E2E link radio bearer or logical channel identities (LCIDs) to egress link radio bearer or logical channel identities (LCIDs).

For example, an end-to-end link which is affected (selected) may be that which comprises an ingress/E2E link whose radio bearer or logical channel identifier is mapped to the egress link radio bearer or logical channel identifier comprised in the generated data block.

In some example embodiments, this may require that the generated data block operates in the RLC acknowledged mode (AM), this terminology being known in the art.

For example, if a generated data block comprises data which is to be sent over the egress link 107 using, say, logical channels with LCIDs #m and/or #n, then the reference data 300/301 may be checked to determine which ingress/E2E link(s) have logical channels mapped to said egress link logical channels #m and/or #n.

Thus, if the generated data block comprises data which is to be sent over the egress link 107 using a logical channel with LCID=#1, then the reference data 300/301 in this case indicates that only the first ingress link 103/E2E link 120 is mapped to it, and hence the RLM procedure for this TB is effectively performed only in relation to the first end-to-end link 120 and the RLC action that may result from the RLM procedure may be performed only in relation to the first end-to-end link.

Similarly, if the generated data block comprises data to be sent over the egress link 107 using logical channels with LCID=#1 and #2, then the reference data 300/301 in this case indicates that it is still only the first ingress link 103/E2E link 120 that is mapped to it, and hence the RLM procedure for this data block is effectively performed only in relation to the first end-to-end link 120 and the RLC action that may result from the RLM procedure may be performed only in relation to the first end-to-end link.

On the other hand, if the generated data block comprises data to be sent over the egress link 107 using a logical channel with LCID=#3, then it will be seen from the reference data 300/301 that this maps to both LCID=#4 of the first ingress link 103/E2E link 120 and #1 of the second ingress link 105/E2E link 130 and hence both the first and second end-to-end links 120, 130 are considered affected for the RLM procedure and RLC action.

In another example embodiment, the selected end-to-end links for RLM and RLC procedures may be based on considering different configurations and/or different QoS characteristics of the different end-to-end links.

For example, if the sidelink RLC entity or radio bearer(s) or logical channel(s) of a direct end-to-end link (without the relay configuration) would only operate in an RLC unacknowledged mode or a HARQ-disabled mode, respectively, the RLM based on RLC retransmission or MAC retransmission for the generated data block may not affect that end-to-end link.

For example, if the first end-to-end link were hypothetically to comprise the first user equipment 102 directly connected by a sidelink to the fourth user equipment 108 without using a relay and that direct sidelink would be configured to operate only in RLC unacknowledged mode or HARQ-disabled mode, e.g. according to network configuration or pre-configuration, then the actual first end-to-end link 120 with the third user equipment 106 acting as a relaying node may not be considered being affected by RLM of the relevant data block and RLC actions may not be performed for the first end-to-end link.

For example, if the generated data block has relatively strict QoS requirements, such as ultra-high reliability and/or low latency requirements, an end-to-end link having less strict QoS requirements may not be considered affected by RLM of the relevant data block and RLC will not be performed for that end-to-end link. For example, if the first end-to-end link 120 were to have a much higher priority than the second end-to-end link 130, the generated data block (TB) populated based on priority may prioritise data from the first user equipment 102, and/or the generated data block may be transmitted by using transmit parameters configured/adapted/controlled for the high priority data transmission. Thus, the first end-to-end link 120 may be considered affected by RLM of the relevant data block whereas the second end-to-end link 130 may not. RLC actions may not be performed for the second end-to-end link 130.

Figure 5:
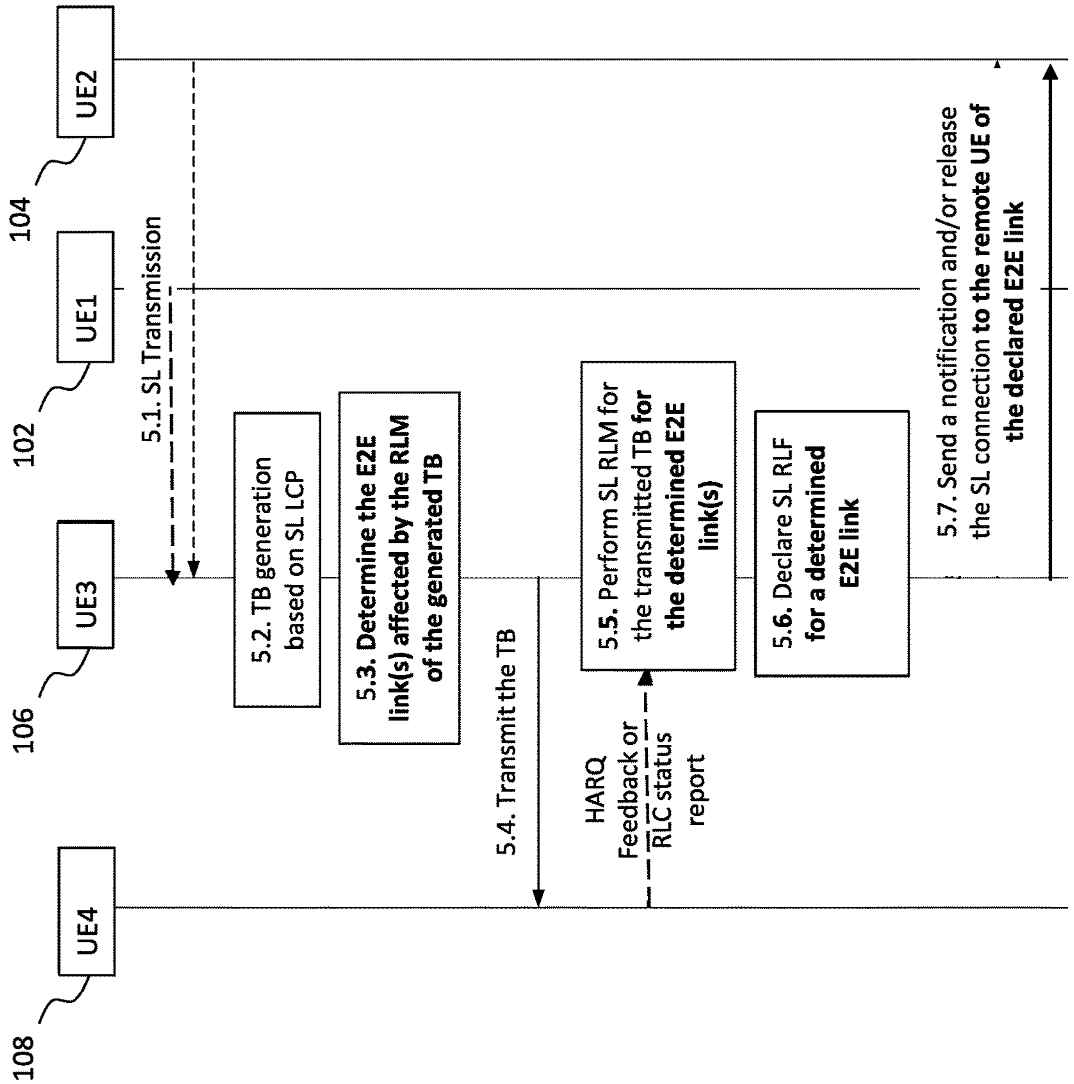
FIG. 5 is a further flow diagram indicating processing operations that may be performed according to some example embodiments.

FIG. 5 is another flow diagram showing operations according to one or more example embodiments, indicating operations that may be performed by each of the FIG. 1 entities including those performed by the third user equipment 106. The operations may be processing operations performed by hardware, software, firmware or a combination thereof. This flow diagram illustrates a more specific set of operations that may be considered separate from, or additional to, the flow diagrams of FIGS. 3A and 3B.

In one or more first operations 5.1, data is received by the third user equipment 106 via one or more sidelink transmissions from the first and/or second user equipment 102, 104.

In a second operation 5.2, the third user equipment 106 may generate a data block (TB) based on a known LCP method and/or a known set of reference data which may map ingress/E2E link radio bearers or logical channels (using respective identifiers) to egress link radio bearers or logical channels (using respective identifiers).

More specifically, the received data and/or the data generated by the third user equipment 106 for its direct end-to-end link with the fourth user equipment 108 may be mapped by the third user equipment 106 to sidelink radio bearer(s)/logical channel(s) of the egress link 107, e.g. using the reference data 300/301 shown in FIG. 3 based on use of the above-mentioned L2 adaptation layer. For the data generated by the third user equipment 106 for its direct end-to-end link with the fourth user equipment 108, the mapping follows the configuration provided by network or pre-configuration, e.g. the same as in 3GPP release 16. The MAC layer at the third user equipment 106 generates the data block which may contain at least some of the received data from the one or more first operations 5.1 or the data generated by the third user equipment 106 for its direct end-to-end link with the fourth user equipment 108 using the LCP method. For example, the LCP method described in 3GPP TS 38.321 Specification may be used, which states that the generated data block (TB) may comprise:

- only data from one or more of the first, second, and third user equipment 102, 104, 106; and/or
- only data from radio bearer(s)/logical channel(s) with high priority; and/or
- only data with HARQ-FeedbackEnabled set to enabled or disabled.

In a third operation 5.3, it is determined which of the end-to-end links 120, 130 and the direct link between the third user equipment 106 and the fourth user equipment 108 are, or will be, affected by RLM of the generated data block. As mentioned above, this may be based on properties of the generated data block and three main embodiments are mentioned above which may be applicable here.

In a fourth operation 5.4, the third user equipment 106 may transmit the generated data block to the fourth user equipment 108 over the egress link 107. In some embodiments, the fourth operation 5.4 may be performed before, or at the same time as the third operation 5.3.

In a fifth operation 5.5, the third user equipment 106 performs RLM in relation to the transmitted data block (TB).

For example, to give some specific examples, this may involve one or more of:

- detecting and counting a number of DTX HARQ feedback messages;
- detecting and counting a number of RLC re-transmissions, based on monitoring/receiving HARQ feedback transmitted via a PSFCH resource and/or RLC status report in a known manner. A RLC status report may be polled as part of the fourth operation 5.4 with the data transmission or in another transmission between the third user equipment 106 and the fourth user equipment 108.

As mentioned above, this RLM is considered relevant only to those end-to-end links 120, 130 determined as affected in the third operation 503. Some examples of how the RLM may operate now follow.

For example, if in the RLC entity HARQ-FeedbackEnabled for the generated data block (TB) is set to enabled, and a discontinuous transmission (DTX) HARQ feedback is determined by the third user equipment 106, the third use equipment may increase the number of consecutive HARQ DTXs for the end-to-end links whose data was multiplexed into the generated data block in the third operation 5.3. Additionally or alternatively, in one embodiment, the third user equipment 106 may increase the number of consecutive HARQ DTXs for the end-to-end links whose data block is configured for being transmitted with enabled HARQ feedback.

For example, if the generated data block comprises a re-transmitted RLC PDU from a radio bearer/logical channel #m in the egress link 107, which operates in RLC acknowledge mode (AM) and the received RLC status report indicates that RLC PDU re-transmission was not successful, the third user equipment 106 may only increase the number of RLC retransmission for the end-to-end links whose data is mapped or can be mapped to radio bearer/logical channel #m in the egress link 107. It is noted that, because the egress link 107 may have more than one RLC entity serving each end-to-end link, e.g. one RLC entity for one LCH, the number of RLC retransmissions is only increased by the RLC entity, which detects the RLC retransmission failure.

For example, if the generated data block has a high priority, the third user equipment 106 may only increase the number of consecutive HARQ DTX and/or the number of RLC retransmission for the end-to-end link with restricted QOS requirements, if the third user equipment detects a DTX HARQ feedback and/or the received RLC status report indicates a failed RLC PDU re-transmission.

In some example embodiments, RLM for each end-to-end link may be performed using multiple sets of counters, of which each set of counters corresponds to one end-to-end link and, optionally, one additional set of counters may correspond to all end-to-end links (in the manner of legacy RLM) but with a more relaxed counter configuration (e.g. using a maximum number of RLC re-transmissions or a maximum number of HARQ DTXs) to trigger RLF for all end-to-end links.

In a sixth operation 5.6, based on the result of the fifth operation 5.5 RLM operations, the third user equipment 106 may perform one or more RLC actions. For example, a RLF action may be declared for one or more end-to-end links. For example, a RLF may be declared if:

- a maximum number of re-transmissions for a particular end-to-end link has been reached; or
- a maximum number of consecutive HARQ DTX for a particular end-to-end link has been reached.

In a seventh operation 5.7, if a RLF is declared in the sixth operation 5.6 for one or more of the end-to-end links, the third user equipment 106 may send a notification to only the input user equipment (e.g. the second user equipment 104 in the FIG. 5 example) for performing RLC (e.g. releasing) the end-to-end link(s) as mentioned above.

In some example embodiments, after notifying and/or releasing one or more of the input user equipment, e.g. the first user equipment 102, based on the above, the third user equipment 106 may proactively initiate (e.g. periodically) sidelink channel status information (CSI) measurements with the fourth user equipment 108 and/or transmit some (e.g. periodic) dummy data to the fourth user equipment within a preconfigured time period T.

In this way, the third user equipment 106 may check the connection with the fourth user equipment 108 for serving one or more other input user equipment, e.g. the second user equipment 104 if the first user equipment 102 was released, without having to relay its data, or before relaying its data. For example, the third user equipment 106 may transmit data having a specific traffic character or pattern which may be associated or tailored to the traffic character or pattern of the second user equipment's end-to-end link, e.g. using the same or similar periodicity or by transmitting dummy data over the radio bearer/logical channel that is or can be used for the second user equipment 104. The value of the pre-configured time period T can be set based on the traffic pattern and QoS for the second input user equipment 104. If the third user equipment 106 does not get a CSI report, HARQ feedback and/or an acknowledged RLC status report from the fourth user equipment 108 within the preconfigured time period T, the third user equipment may determine to release the second user equipment 104 also.

Example embodiments may improve RLM and RLC methods by enabling the relay user equipment, in this case the third user equipment 106, to maintain and perform separate RLM processes for the different end-to-end links 120, 130 based on monitoring, for example, (re-)transmissions of the data block over one single egress link 107.

In some example embodiments, the relay user equipment, in this case the third user equipment 106, may be configured to perform the separate RLM processes as described herein for the different end-to-end links 120, 130 based on some triggering or enabling event or criteria. For example, if the third user equipment 106 receives an indication from a separate node, or self-detects, that there is no other relay user equipment candidate in proximity to the first, second and fourth user equipment 102, 104, 108, or there is a low probability that another relay user equipment candidate is in said proximity, this may trigger or enable the third user equipment 106 to operate in the manner described in any of the above examples.

In some example embodiments, the described operations may be applied in an alternative scenario to that shown in FIG. 1. For example, consider a scenario which is effectively the reverse of the FIG. 1 relaying configuration 100 whereby transmission is performed from the fourth user equipment 108 to one or both of the first and second user equipment 102, 104, again relayed by the third user equipment 106. Here, there are effectively two end-to-end links, one between the fourth user equipment 108 and the first user equipment 102 and one between the fourth user equipment and the second user equipment 104. Instead of declaring an RLF, the fourth user equipment 108 may trigger relay re-selection for the affected end-to-end link. In other words, as an example, if the fourth user equipment 108 declares an RLF condition with the third user equipment 106, this may only affect one of the end-to-end links and that end-to-end link may be released whilst the other end-to-end link may remain active with the third user equipment acting as the relay.

FIG. 6 shows a different relaying configuration 600 to confirm that the FIG. 1 relaying configuration 100 can be generalised. As shown in FIG. 6, a further, fifth user equipment 601 is shown and data transmissions between any two user equipment 102, 104, 106, 108, 601 can be performed in one direction or bi-directionally. Thus, besides the considered scenario of transmissions from the first and/or second user equipment 102, 104 to the fourth user equipment 108 via the third user equipment 106, the third user equipment may also be used as a relaying node to assist, for example, transmissions from the fourth user equipment and/or the fifth user equipment 601 to one or both of the first and second user equipment.

FIG. 7 shows a further relaying configuration 700 whereby, in place of the fourth user equipment 108 is a radio network base station 701. In this relaying configuration 700, the third user equipment 106 may act as a user equipment-to-network relay for transmission from one or both of the first and second user equipment 102, 104 to the base station 701 and/or the fifth user equipment 601. If the third user equipment 106 were to declare a RLF for the base station 701, e.g. due to a maximum number of re-transmissions in the RLC entity, the described embodiments may apply here such that RLM procedures for the provided end-to-end links between each of the user equipment and base station combinations may be performed separately.

Example Apparatus

Figure 8:
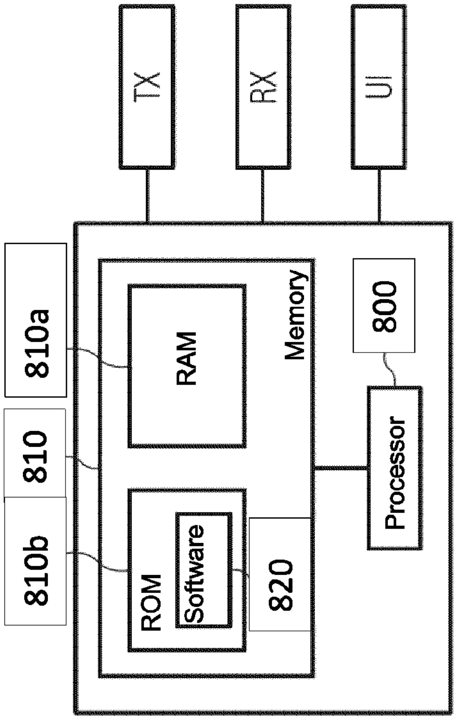
FIG. 8 is a block diagram of an apparatus that may be configured according to some example embodiments.

FIG. 8 shows an example apparatus. The apparatus may, for example, comprise the third user equipment 106 of FIG. 1.

The apparatus may comprise at least one processor 800 and at least one memory 810 directly or closely connected or coupled to the processor. The memory 810 may comprise at least one random access memory (RAM) 810*a* and at least one read-only memory (ROM) 810*b*. Computer program code (software) 820 may be stored in the ROM 810*b*. The apparatus may be connected to a transmitter path and a receiver path in order to obtain respective signals or data. The apparatus may be connected with a user interface (UI) for instructing the apparatus and/or for outputting data. The at least one processor 800 with the at least one memory 810 and the computer program code 820 may be arranged to cause the apparatus to at least perform methods described herein, such as those described with reference to FIGS. 4 and/or 5.

The processor 800 may be a microprocessor, plural microprocessors, a microcontroller, or plural microcontrollers.

The memory 810 may take any suitable form.

Figure 9:
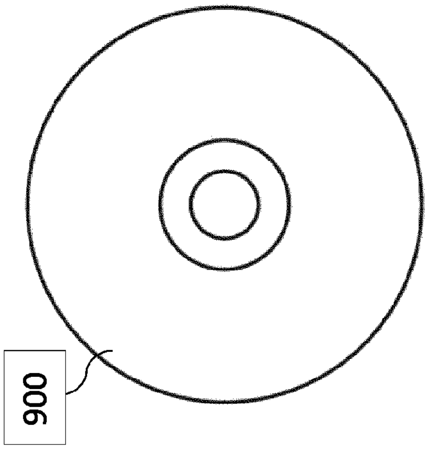
FIG. 9 is a plan view of a non-transitory media which may comprise computer-readable code or instructions for performing some example embodiments when executed on, for example, the FIG. 8 apparatus.

FIG. 9 shows a non-transitory media 900 according to some embodiments. The non-transitory media 900 is a computer readable storage medium. It may be e.g. a CD, a DVD, a USB stick, a blue ray disk, etc. The non-transitory media 900 stores computer program code causing an apparatus to perform operations described above when executed by a processor such as processor 800 of FIG. 8.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. An apparatus, comprising:

at least one processor; and at least one memory storing instructions that, when executed by the at least one processor, cause the apparatus at least to:

generate a data block comprising data for transmission over an egress link to a destination device, the data being received from one or more of a plurality of input devices over respective ingress links or being provided by the apparatus;

transmit the data block to the destination device;

select one or more end-to-end links between an input device of said plurality of input devices and the destination device, or the apparatus and the destination device, wherein the one or more end-to-end links are selected from a plurality of candidate end-to-end links based on one or more properties of the generated data block that comprise an identity of one or more radio bearers or logical channels of the egress link over which the data block will be transmitted;

perform radio link monitoring for the transmitted data block in relation to the selected one or more end-to-end links; and perform radio link control in relation to at least one of the selected one or more end-to-end links based on the radio link monitoring.

2. The apparatus of claim 1, wherein the generated data block comprises data from at least one of the one or more input devices and/or data provided by the apparatus.

3. The apparatus of claim 1, wherein the at least one processor and the at least one memory storing instructions that, when executed by the at least one processor, cause the apparatus to populate the data block with one or more sub-blocks, respective ones of the one or more sub-blocks corresponding to data received from an input device, or data provided by the apparatus, and associated at least with an identifier indicative of one or more of (i) the input device, (ii) the apparatus, (iii) the ingress link and (iv) the end-to-end link.

4. The apparatus of claim 3, wherein the one or more selected end-to-end links are selected based on the one or more identifiers in the generated data block.

5. The apparatus of claim 1, the at least one processor and the at least one memory storing instructions that, when executed by the at least one processor, cause the apparatus further to access reference data which maps ingress and/or end-to-end link radio bearer or logical channel identities to egress link radio bearer or logical channel identities, the one or more selected end-to-end links comprising the one or more end-to-end, or associated ingress links, whose radio bearer or logical channel identities are mapped to the one or more egress link radio bearer or logical channel identities identified in the generated data block.

6. The apparatus of claim 1, wherein the one or more selected end-to-end links are selected based on determining that the generated data block is set to operate in a radio link control (RLC) acknowledged mode (AM).

7. The apparatus of claim 1, wherein the one or more selected end-to-end links are selected based on determining that data sent directly between one or more of the input devices and the destination device would operate in an RLC unacknowledged mode and/or hybrid automatic repeat request (HARQ) disabled mode, and responsive to said determination, determining not to select the end-to-end links associated with said one or more input devices.

8. The apparatus of claim 1, wherein the one or more selected end-to-end links are selected based on determining that the generated data block comprises a first sub-block associated with high priority data of a first end-to-end link and a second sub-block associated with low priority data of a second end-to-end link, and responsive to said determination, determining to select the first end-to-end link and not the second end-to-end link.

9. The apparatus of claim 1, wherein the generated data block is a Media Access Control (MAC)-Protocol Data Unit (PDU) or a Radio Link Control (RLC) Protocol Data Unit (PDU).

10. The apparatus of claim 1, wherein the radio link control is configured to terminate, or cause termination of, one or more of the end-to-end links based on determination by the radio link monitoring of a radio link failure condition.

11. The apparatus of claim 10, wherein the radio link monitoring is configured to determine a radio link failure condition based on one or more of:

(i) a predetermined threshold number of retransmissions of the data block to the destination device having been reached; and (ii) a predetermined threshold number of consecutive hybrid automatic repeat request (HARQ) feedback discontinuous transmissions from the destination device.

12. The apparatus of claim 1, wherein the apparatus and the respective input devices are user equipment devices.

13. The apparatus of claim 1, wherein the destination device is a user equipment device or network node.

14. A method, the method comprising:

generating, by an apparatus, a data block comprising data for transmission over an egress link to a destination device, the data being received from one or more of a plurality of input devices over respective ingress links or being provided by the apparatus;

transmitting the data block to the destination device;

selecting one or more end-to-end links between an input device of said plurality of input devices and the destination device, or the apparatus and the destination device, wherein the one or more end-to-end links are selected from a plurality of candidate end-to-end links based on one or more properties of the generated data block that comprise an identity of one or more radio bearers or logical channels of the egress link over which the data block will be transmitted;

performing radio link monitoring for the transmitted data block in relation to at least one of the selected one or more end-to-end links; and performing radio link control in relation to the selected one or more end-to-end links based on the radio link monitoring.

15. The method of claim 14, wherein the generated data block comprises data from at least one of the one or more input devices and/or data provided by the apparatus.

16. The method of claim 14, wherein the method further comprises populating the data block with one or more sub-blocks, respective ones of the one or more sub-blocks corresponding to data received from an input device, or data provided by the apparatus, and associated at least with an identifier indicative of one or more of (i) the input device, (ii) the apparatus, (iii) the ingress link and (iv) the end-to-end link.

17. The method of claim 16, wherein the one or more selected end-to-end links are selected based on the one or more identifiers in the generated data block.

18. A non-transitory computer readable medium comprising program instructions that, when executed by an apparatus, cause the apparatus to perform at least the following:

generate, by the apparatus, a data block comprising data for transmission over an egress link to a destination device, the data being received from one or more of a plurality of input devices over respective ingress links or being provided by the apparatus;

transmit the data block to the destination device;

select one or more end-to-end links between an input device of said plurality of input devices and the destination device, or the apparatus and the destination device, wherein the one or more end-to-end links are selected from a plurality of candidate end-to-end links based on one or more properties of the generated data block that comprise an identity of one or more radio bearers or logical channels of the egress link over which the data block will be transmitted;

perform radio link monitoring for the transmitted data block in relation to at least one of the selected one or more end-to-end links; and perform radio link control in relation to the selected one or more end-to-end links based on the radio link monitoring.

* * * * *